US006412670B1

(12) United States Patent
Randmae et al.

(10) Patent No.: US 6,412,670 B1
(45) Date of Patent: Jul. 2, 2002

(54) CANDLE MAKING APPARATUS

(76) Inventors: Alan Randmae; Ryan Taliercio, both of 110 Wells Rd., Northport, NY (US) 11768

(*) Notice: Subject to any disclaimer, the term of this patent is extended or adjusted under 35 U.S.C. 154(b) by 0 days.

(21) Appl. No.: 10/079,099

(22) Filed: Feb. 19, 2002

Related U.S. Application Data

(60) Provisional application No. 60/274,466, filed on Mar. 12, 2001.

(51) Int. Cl.[7] .................................................. G01F 11/28

(52) U.S. Cl. ......................... 222/452; 425/803; 249/93; 249/105; 249/117

(58) Field of Search .............................. 222/146.5, 442, 222/450, 452, 451; 425/803, 448; 249/93, 105, 117

(56) References Cited

U.S. PATENT DOCUMENTS

| | | | | | |
|---|---|---|---|---|---|
| 2,520,682 | A | | 8/1950 | Harrison et al. | 18/39 |
| 2,904,230 | A | | 9/1959 | Worth | 222/452 |
| 3,002,221 | A | * | 10/1961 | Wright | 425/803 |
| 3,034,174 | A | * | 5/1962 | Kranc et al. | 425/803 |
| 3,129,853 | A | | 4/1964 | Hoskins | 222/339 |
| 3,291,034 | A | * | 12/1966 | Sohn et al. | 222/451 |
| 3,327,905 | A | | 6/1967 | Gould | 222/331 |
| 3,351,239 | A | * | 11/1967 | Flock | 222/452 |
| 3,385,649 | A | | 5/1968 | Hicks | 431/126 |
| 3,680,995 | A | * | 8/1972 | Frazier, Jr. et al. | 425/803 |
| 4,004,773 | A | | 1/1977 | Binder | 249/93 |
| 4,030,867 | A | | 6/1977 | Everman | 425/144 |
| 4,165,681 | A | * | 8/1979 | Belinkoff | 222/452 |
| 4,429,815 | A | | 2/1984 | Libit | 222/452 |
| 4,614,859 | A | | 9/1986 | Beckering et al. | 219/312 |
| 4,664,163 | A | | 5/1987 | Desai | 141/320 |
| 5,078,945 | A | | 1/1992 | Byron | 264/278 |
| 5,248,070 | A | | 9/1993 | Nolte et al. | 222/442 |
| 5,988,446 | A | | 11/1999 | Schitter | 222/146.5 |
| 6,098,953 | A | | 8/2000 | Machado | 249/93 |
| 6,220,855 | B1 | | 4/2001 | Asheim | 431/294 |

* cited by examiner

*Primary Examiner*—Lesley D. Morris
*Assistant Examiner*—Thach H. Bui

(57) ABSTRACT

An apparatus for making molded candles from wax pieces of old candles or new candle-making wax. The candle making apparatus comprising an electrically heatedmelting chamber from which melted wax flows into an attached dispensing chamber and a valving mechanism which, when turned by hand, allows a pre-set amount of melted wax to flow into a removable mold, eliminating the need for measuring by the user. The apparatus accomodates making candles of different volumes, whereby the removable molds may be filled by the user of the apparatus by executing a predefined number of turns of the valving mechanism. The removable mold also functions to hold the candle wick in plan, and may be made to form candles of various shapes and sizes.

18 Claims, 5 Drawing Sheets

DETAIL A

CANDLE MAKING APPARATUS

CROSS-REFERENCE TO RELATED APPLICATION

This application claims the benefit of U.S. Provisional Patent Application Serial No. 60/274,466 filed Mar. 12, 2001.

BACKGROUND OF THE INVENTION

The invention described herein relates to the art of candle making but particularly to a method and an apparatus for making candles using pieces of used candles or using new candle wax by the consumer.

The art of candle making is old and well known. Numerous machines and devices have been configured for this purpose, however relatively few are known to be suitable for recycling old candle wax for making new candles by the consumer for household use. Although candles were originally intended to be used for illumination purposes, today they are often used for decorative purposes or to add to the ambiance of homes Decorative or scented candles have become extremely popular and are commonplace in the home.

When candles are burned, especially in the larger sizes, they invariably leave a shell of unburned wax and wax drippings which are normally discarded. This invention will enable the consumer to utilize this leftover old candle wax to form new usable candles, as well as make candles using new candle wax. This invention will also make the operation of the apparatus safer, reducing the danger of hot molten wax spillage, by means of a novel dispensing method by which a predetermined amount of wax is dispensed into a mold by the operator.

Various candle recycling devices have previously been proposed. A number of these devices attempt to salvage the drippings of burning candles through the use of special candle holders having wax collection containers beneath them. Other devices are designed to burn candles at inclined angles over a collection device. Such devices are shown in Machado, Candle Recycling Assembly, U.S. Pat. No. 6,098, 953, Byron, Combined Candle Holder and Mold Apparatus and Method, U.S. Pat. No. 5,078,945, and Asheim, Candle Stand and Wax Recycling Assembly, U.S. Pat. No. 6,220, 855 B1. These methods, although potentially feasible, are highly inefficient since most candles made today are of the dripless variety. Furthermore, when candles are burned at an inclined angle, they burn much more rapidly producing soot and smoke. Also, these methods as disclosed do not provide a way of controlling the amount of wax accumulation in a receptacle.

A further device is shown in Schitter, Candle Making Device, U.S. Pat. No. 5,988,446. This patent discloses a funnel shaped, heated container into which pieces of old candle wax are placed for melting into liquid form. A drain tube extending downward from the bottom of the funnel directs the molten wax into the mold. A valve is inserted into the drain tube to manually open or close the drain tube. This device, although suitable for recycling old candle waxis of open construction with no exterior shell. This exposes the heater and associated hot surfaces to the touch of the operators hands. It also has no provision to control the amount of wax flowing from the funnel to the mold, thus creating a potential hazard forspillage of hot wax.

A number of other prior art patents disclose methods for dispensing finite or variable volumes of particulate or fluid matter. Many of these devices are intended for attachment to jars or containers that dispense edible particulate substances such as sugar, salt, coffee, etc. Such devices are shown in U.S. Pat. Nos. 4,664,163, 4,429,815, 3,327,905, 3,129,853 and 2,904,230. Although these devices may be well suited for their intended purpose, they are not suitable for dispensing molten wax since they do not have sealing elements between their moving parts. Also, they do not provide means for heating, thus they are unable to keep wax in a molten state.

Another dispensing device is shown in Nolte et al., Volumetric Measuring/Dispensing Device, U.S. Pat. No. 5,248,070. This device is intended to measure and dispense variable amounts of liquid to another container. It provides a graduated measuring container which is intended to be filled with a liquid to a particular desired leveland then dispensed therefrom. This method requires observation by the operator to achieve the amount of liquid to be dispensed. Also, the device is not heated and is therefore not able to handle melted wax at elevated temperatures. Furthermore, this device is quite complex and therefore relatively expensive to manufacture.

OBJECTS OF THE INVENTION

It is an object of this invention to overcome the disadvantages of the prior art cited above and provide an apparatus for making candles which may be used either for recycling used candle pieces or for making candles using new candle wax.

It is a further object of this invention to provide an apparatus for making candles that can be operated safely by an unskilled person.

It is a further object of this invention to provide an apparatus for making candles which incorporates a measuring chamber to allow only a predetermined amount of molten wax to be dispensed into a mold.

It is another object of this invention to provide an apparatus for making candles which includes a screen to catch any debris that may be present in old candle wax that is easily removable for cleaning.

It is another object of this invention to provide an apparatus for making candles which uses a predetermined heater capacity allowing the apparatus to be operated continuously without the possibility of overheating.

It is another object of this invention to provide an apparatus for making candles which is easy to use in the home or which may be alternatively used for the “arts and crafts” trade.

It is another object of this invention to provide an apparatus for making candles which is simple in construction and inexpensive to build.

It is yet another object of this invention to provide an apparatus for making candles that may be used for producing candles of various shapes and sizes.

Further objects and advantages of the invention will become apparent from the following summary, specifications and drawings.

SUMMARY OF THE INVENTION

According to this invention, an apparatus is provided which enables the operator to make variously shaped and sized candles using old, otherwise discardable candle pieces or new candle wax. The apparatus comprises a hollow melting chamber connected at the bottom to a somewhat smaller dispensing chamber. These chambers are electrically heated to melt wax deposited in the melting chamber and to keep the wax in both chambers in a liquid state The dispensing chamber contains a valving arrangement that, when rotated to one angular position allows molten wax to enter and fill the dispensing chamber, and when rotated to another angular position dispenses the wax into a candle mold. The candle mold and both chambers are contained within a housing made preferably of heat resistant plastic. The housing provides support for all the working parts of the apparatus and protects the operator from the heated surfaces therein. A base is also provided to support the candle mold and to create a stable footing for the apparatus to protect it from tipping. A screen located in the melting chamber collects debris, such as old wicking material or decorative solid material contained in old candle wax. The screen is equipped with handles for easy removal and cleaning. A hollow shaft extending upward and attached to the valving assembly connects to a knob at the top of the apparatus to allow the operator to rotate the valving assembly to either fill or dispense positions. The hollow shaft also functions as an air vent during the fill and dispense operations. The candle molds are removable from the housing by means of an attachable convenience handle. The molds may be made in a variety of sizes, shapes or materials. Provision is also made in the handle to support a candle wick.

The foregoing and other aspects of the invention will become clear from the following detailed description and the accompanying drawings.

DESCRIPTION OF THE PREFERRED EMBODIMENT

Figure 1:
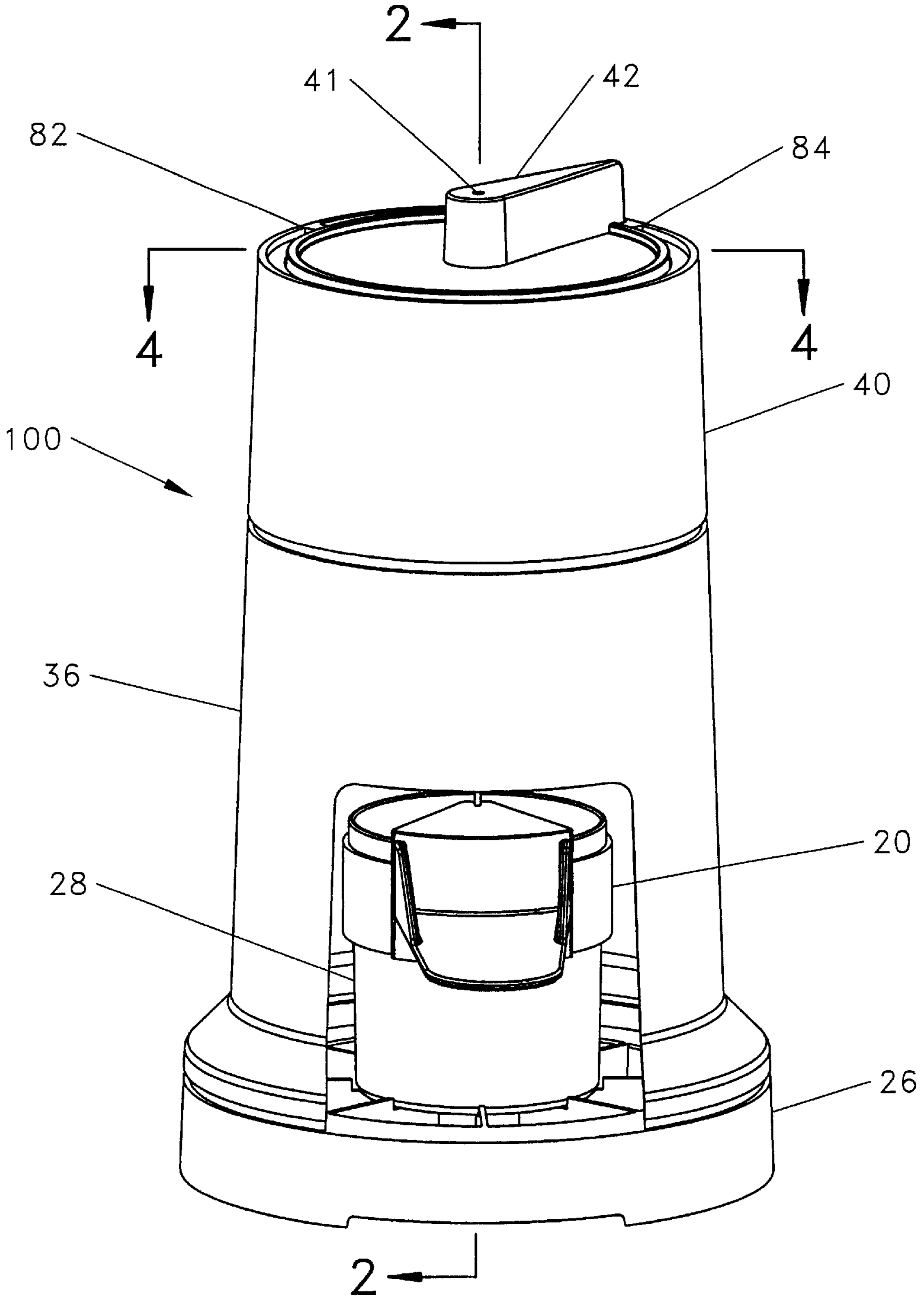
FIG. 1 shows an exterior view of the candle making apparatus with its housing, base and candle mold in their normal positions.
Figure 4:
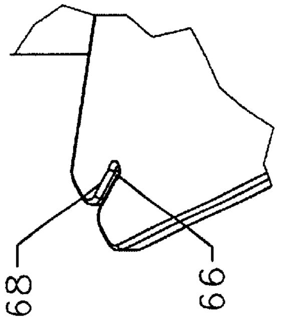
FIG. 4 is a top view of the melting and measuring chambers of the apparatus, taken at line 4—4 of FIG. 1, showing the valving ports and the motion of the valve body.
Figure 4:
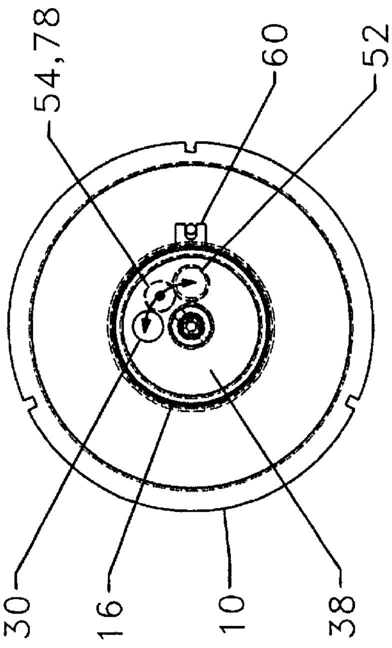
Figure 5:
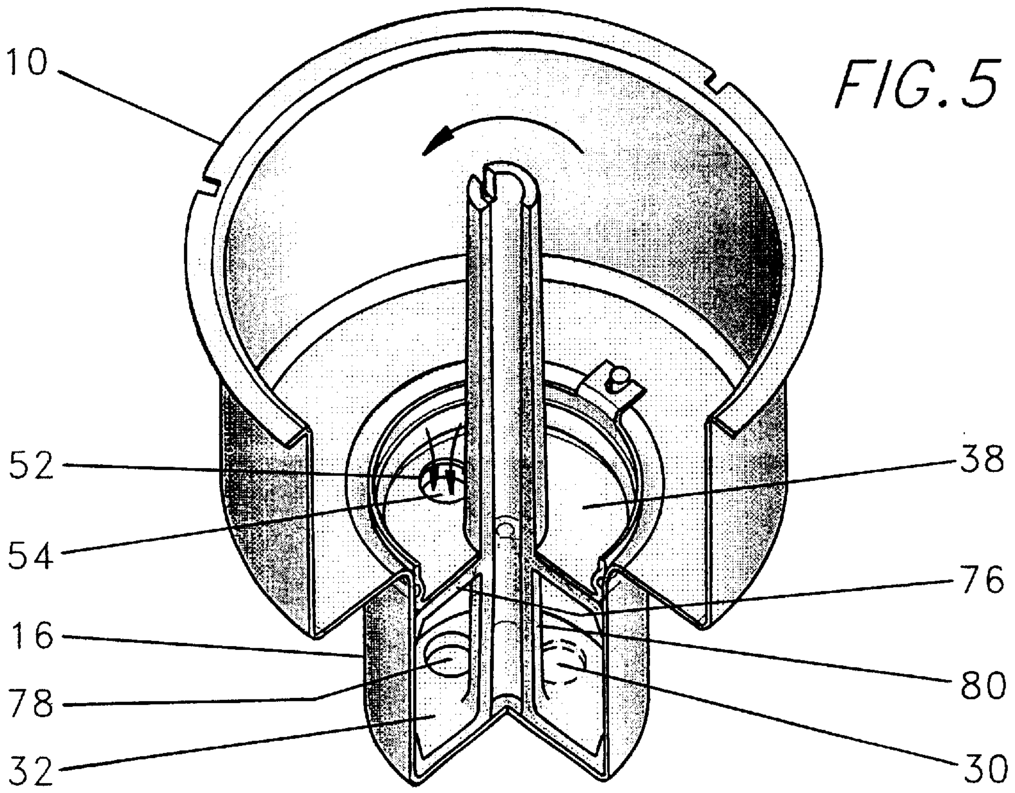
FIG. 5 is a perspective cutaway view of the melting chamber and valve body in the fill position of the measuring chamber.
Figure 6:
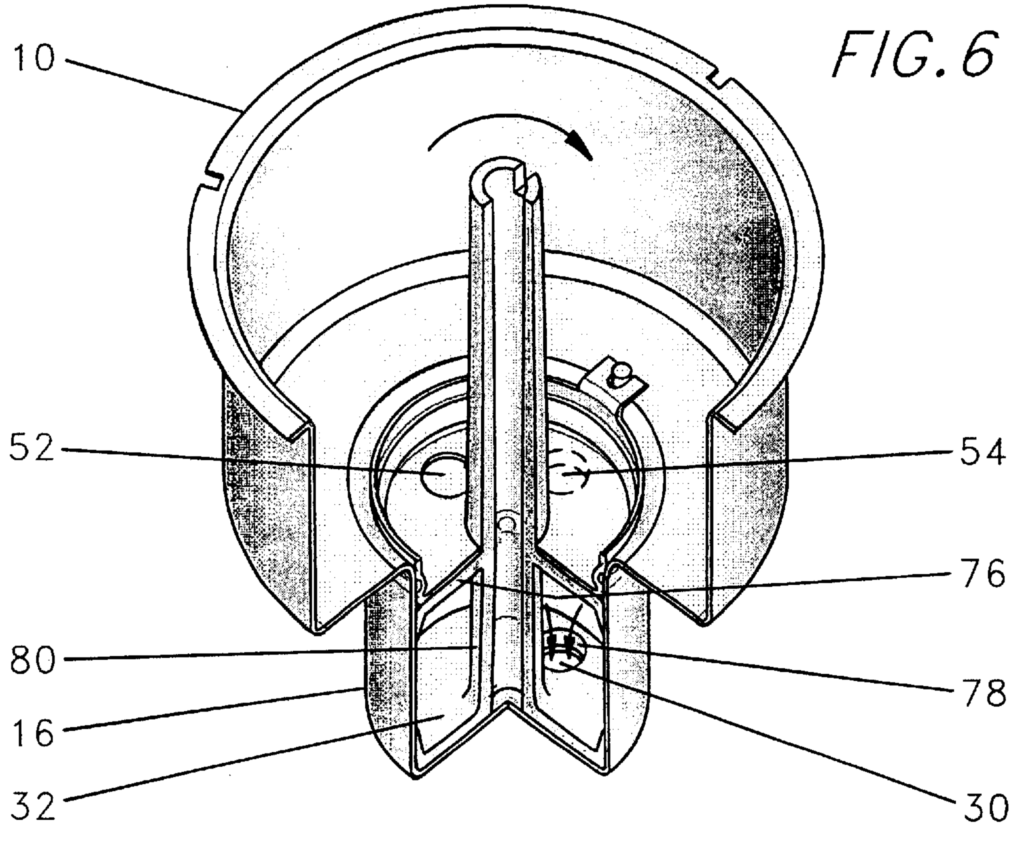
FIG. 6 is a perspective cutaway view of the melting chamber and valve body in the dispense position of the measuring chamber.

With reference to the drawings, FIG. 1 through FIG. 9, the present invention indicated by numeral 100 in FIG. 1 will now be described. In particular, referring to FIGS. 1 and 2 a cylindrical heating chamber 10 sized to accept pieces of candle wax is positioned in and supported by upper housing 40 and lower housing 36. Directly below heating chamber 10 and attached thereto is a cylindrical wax dispensing chamber 16. The floor 44 and walls of wax dispensing chamber 16 is fabricated in one piece with heating chamber 10 whereas the top surface is part of a cap 38 inserted subsequently in the assembly process. The cap 38 is fitted to the inside wall of wax dispensing chamber 16 with only a small clearance and is sealed to it by an "O" ring 14. An anti-rotation device 60 prevents the rotation of cap 38 within dispensing chamber 16. See FIG. 4. A valve body 80, having an upper portion 12 incorporating a sealing disc 76 and a lower portion 18 incorporating a sealing disc 32, resides within wax dispensing chamber 16. The spacing of the sealing discs is such that the top surface of sealing disc 76 is in intimate contact with cap 38 and similarly, the bottom surface of sealing disc 32 is in intimate contact with the floor 44 of dispensing chamber 16. The circumference of each sealing disc is formed with a thin lip which makes a seal with the cylindrical wall of wax dispensing chamber 16. Portions 12 and 18 of valve body 80 are keyed to each other so that they rotate within wax dispensing chamber 16 in unison. A circular opening 54 in sealing disc 76 is angularly aligned with a circular opening 78 in sealing disc 32. As shown in FIGS. 4, 5 and 6, a filling opening 52 in cap 38 is positioned about 90 degrees from a dispensing port 30 in the bottom surface of dispensing chamber 16. When valve body 80 is rotated so that opening 54 in disc 76 is aligned with opening 52 in cap 38, opening 78 in disc 32 is not aligned with dispensing port 30 and the dispensing port is therefore closed. See FIG. 5. Molten wax may now flow from heating chamber 10 to fill the dispensing chamber 16. Similarly, when the valve body is rotated so that opening 78 in disc 32 is aligned with dispensing port 30, opening 54 in disc 76 will not be aligned with opening 52 and thus the filling port is closed. See FIG. 6. This action will therefore allow dispensing chamber 16 to be filled in one angular position of valve body 80, and to be emptied in another position of the valve body. Vent holes 13 and 15 in valve body 80 and 41 in knob 42, shown in FIG. 2, allow air to escape from dispensing chamber 16 during the filling operation and conversely allow air to enter during the dispensing operation.

A shaft, part of upper portion 12 of valve body 80 extends upward through heating chamber 10 and is removably attached and keyed to knob and cover combination 42. Stop tabs 82 and 84, part of upper housing 40, and shown in FIG. 1, are positioned such that they limit rotation of knob 42 to about 90 degrees. Knob and cover combination 42 is removable to access top of heating chamber 10 for filling with wax. The cover and knob combination 42 is made from a transparent plastic material to allow observation of the melting process.

A screen 72, preferably made from metal mesh, is formed into a cylindrical shape to fit into heating chamber 10. A central hole allows screen 72 to be inserted into heating chamber 10 over shaft 12. The screen will collect old wicking material or other debris that may be present in old candle wax. Tabs 74, formed inward from the screen material, allow easy removal of screen 72 for cleaning.

An electric heater 34 surrounds and is in close contact with heating chamber 10 and dispensing chamber 16 to melt wax placed in heating chamber 10 and to keep wax contained in dispensing chamber 16 in a molten state. The heater is directly connected by conventional means to household electric current by a standard line cord (not shown).

Heating chamber 10, dispensing chamber 16 with valve body 80, and heater 34 are held in position between lower housing 36 and upper housing 40 by clamping action exerted by snapping upper housing 40 to lower housing 36 by means of latching hooks 86. See FIG. 2.

Figure 2:
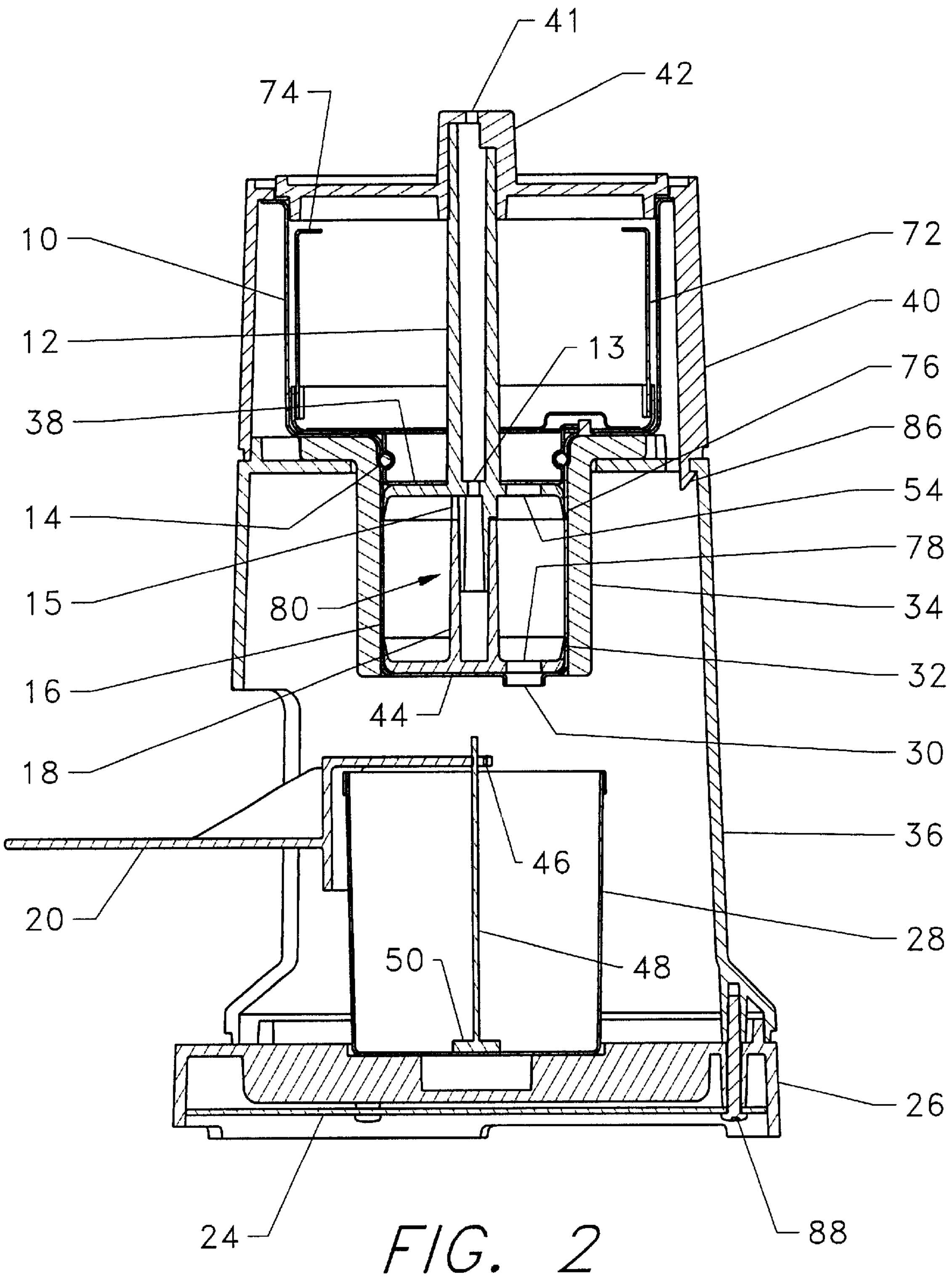
FIG. 2 is a cross sectional view through the middle of the apparatus taken at line 2—2 of FIG. 1 showing details of construction of the apparatus.
Figure 3:
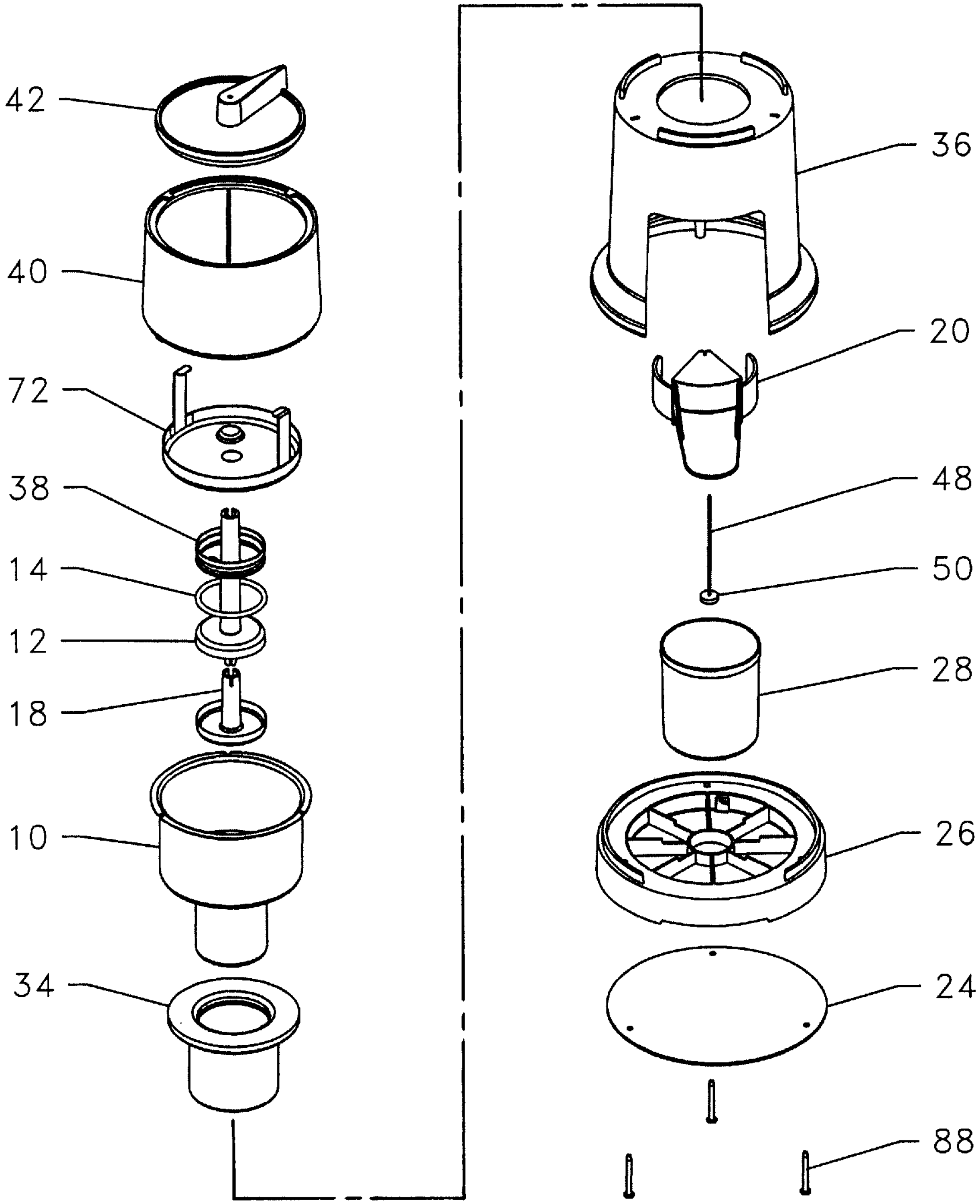
FIG. 3 is an exploded view of the various parts of the apparatus.
Figure 7:
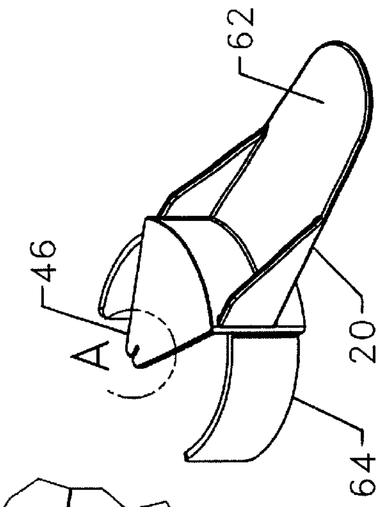
FIG. 7 is a perspective view of the candle mold handle with provision to hold the candle wick in place.
Figure 10:
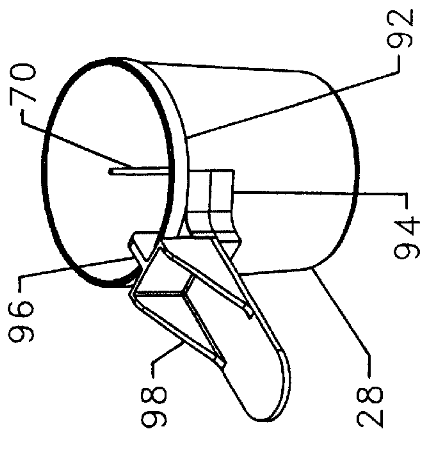
FIG. 10 shows an alternate way to attach a handle to candle molds of various shapes.
Figure 9:
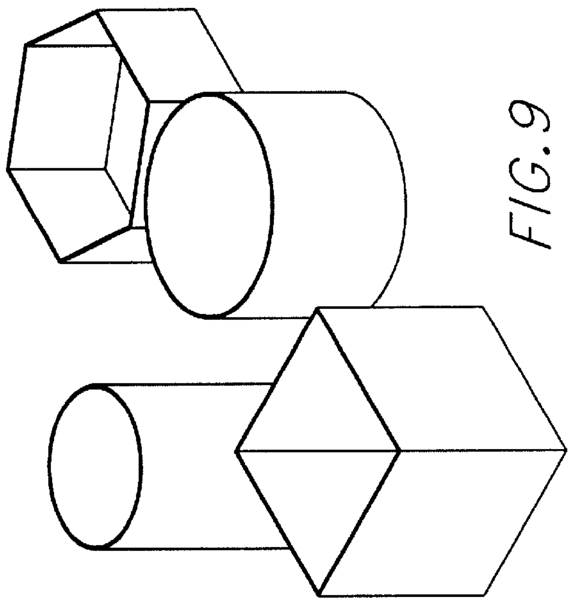
FIG. 9 is a view showing some of the possible shapes of candle molds that may be used in forming candles.

A base 26 is attached to the bottom of housing 36 by screw fasteners 88. A candle mold 28 is placed on base 26 for receiving wax dispensed from dispensing chamber 16. A handle 20 is clamped around candle mold 28 by means of flexible members 64 so that the mold may be easily removed from the apparatus. Referring to FIGS. 7 and 2, handle 20 incorporates grip 62 and a wick holder 46 having a slot 68 and an opening 66. Opening 66 is sized to hold a strand of wicking material 48 in place so it may hang into candle mold 28. The wicking material will be kept straight and central to candle mold 28 by the gravity action of a sinker 50 stamped from relatively thin sheet metal. As shown in FIG. 9, candle molds 28 may be made in a variety of shapes and sizes, within the limitation of the apparatus, provided the volume of the smallest mold is not less than a single discharge from dispensing chamber 16. The candle molds should preferably be made so that the walls of the molds have draft, that is, the dimension across the top of the mold should be larger than that at the bottom, to facilitate removal of the finished candle from the mold. Also, the interior of the molds may be coated with a non-stick material such as a Teflon (PTFE) coating. FIG. 10 shows an alternative method of attaching a handle 98 to candle mold 28. A hook 96 grasps the inside surface of candle mold 28 while flexible members 94 at each side of handle 98 rest against the outside surface of candle mold 28 and also catch the bottom of lip 92 thus securely latching onto the candle mold. Flexible members 94 allow handle 98 to be attached to various shapes of candle molds from straight sided to cylindrical in all diameters suitable for use in the apparatus.

Figure 8:
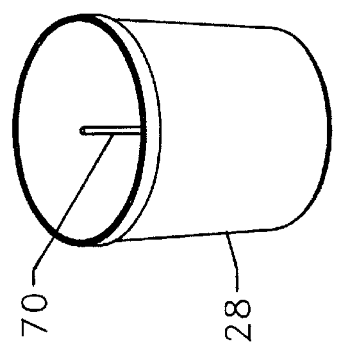
FIG. 8 is a perspective view of a candle mold showing an internal post designed to form a channel into the finished candle for insertion of a wick.

Numerous alternative methods of inserting a wick into the finished candle may be employed, one of which is illustrated in FIG. 8. A central protruding post 70 of relatively small diameter is attached to the interior of candle mold 28 which produces a hole in the finished candle into which a wick may be subsequently placed by pulling the wick material through with a wire hook or a similar tool.

A bottom plate 24 serves to cover the bottom of base 26 concealing electrical wiring to heater 34.

OPERATION

The function of the invention described and illustrated above is to melt either old wax pieces from normally discarded candles or new candle wax available from generally known sources of supply. The apparatus, when connected to normal household current, energizes electric heater 34 to a temperature sufficient to melt candle wax, approximately 180 degrees F. to 220 degrees F. The capacity of the heater required to accomplish this is approximately 80 watts. The heating chamber 10 is sized to hold enough wax for several dispensing cycles of valve body 80. After the wax placed into heating chamber 10 has melted, knob 42, with attached valve body 80, is turned to the fill position, opening port 52 and allowing wax to flow into dispensing chamber 16. When the dispensing chamber is full, knob 42 is turned to the dispensing position, closing port 52 and opening port 30, causing the molten wax to flow into candle mold 28. When making a candle, the fill and dispense operation may be repeated a predetermined number of cycles depending on the internal volume of the candle mold.

CONCLUSION, RAMIFICATIONS AND SCOPE

As can be seen from the foregoing description, this patent provides a convenient means to salvage leftover candle wax from used candles as well as enable anyone to make candles using new candle wax. The apparatus may be operated safely, since the heater utilized is limited in its wattage output such that it is adequate for melting wax in a reasonable length of time, but can not be overheated to cause damage to the apparatus. Furthermore, the enclosed construction prevents the operator from touching the hot components of the apparatus. Wax may be added to the melting chamber at any time by removing the combination knob and cover which is preferably made from a translucent plastic so that the melting process may be observed through it. The screen, which is accessible after the cover is removed may be easily removed for discarding the contaminants and cleaning. The candle molds, which are accessible through an opening in the lower housing, may be variously shaped as round, square, rectangular, hexagonal, etc. to provide variety and interest to the finished product and additives may be added to the candle wax to produce effects such as scents, decorative appearance, or insect repellence. The apparatus is thus suitable for use in the home for simply reclaiming or recycling old candle wax or as a tool for producing candles for the "arts and crafts" trade.

While the above description contains many specific features, these should not be construed as limitations on the scope of the invention, but rather as an exemplification of one preferred embodiment thereof. Many other variations are possible. For example, the valve body may be made in one piece, machined from a metal such as aluminum and sealed to the side of the dispensing chamber by circular "O" ring seals. The heating and dispensing chambers may be fabricated separately and joined by welding, cementing, etc. The screen may or may not be utilized depending on whether the candle maker is used with old or new candle wax. Although a single heating element is shown in the description, two or more elements may be used with or without a protective thermostatic device. The supporting housing as well as the base of the candle maker may be made in various sizes, shapes and materials. In place of the handle clamped around the cup, an insulated sleeve may be used instead. To hold the wick, a simple bar across the top edge of the cup may be utilized. Wicks with built-in rigid cores are readily available and may be substituted for wicks with pre-attached sinkers.

Accordingly, the scope of the invention should be determined not by the embodiment illustrated, but by the appended claims and their legal equivalents.

We claim:

1. A candle making apparatus comprising.

a) a hollow melting chamber having an open top, to allow said melting chamber to be filled with candle wax, and a bottom having an opening to allow molten wax to be discharged therefrom, b) a wax dispensing chamber locatable beneath said melting chamber such that molten wax may flow from said melting chamber into said dispensing chamber, said dispensing chamber having a predetermined volume and means to allow discharging such predetermined volume of molten wax therefrom by an action of the user so that a single volume or multiple volumes of wax may be dispensed, c) at least a singular heater element locatable in close proximity of said melting chamber to melt wax placed in said melting chamber and to maintain a liquid state of wax in said dispensing chamber, d) a casting mold placed so that molten wax discharged from said dispensing chamber may enter said casting mold and cool to form a candle, whereas said casting mold may be made in various shapes and sizes, e) a candle wick insertable into said candle mold and means for supporting said candle wick within said candle mold so that molten candle wax may solidify around it, whereby candles of a variety of sizes and shapes may be formed either by recycling partially used candles or using new candle wax.

2. The candle making apparatus of claim 1 further including a housing comprising a base and an upwardly extending body to provide means for support for said melting chamber, said dispensing chamber, said heating element and said casting mold to maintain their relative positions.

3. The candle making apparatus of claim 1 wherein said wax dispensing chamber is cylindrical in shape, having openings at its top and bottom surfaces, said openings being angularly displaced by a predetermined distance and radially positioned approximately mid-way between the circumferential wall and the centerline of said cylindrical dispensing chamber.

4. The candle making apparatus of claim 3 further including a valve body, locatable in said wax dispensing chamber, comprising a pair of sealing discs closely fitted to the cylindrical wall and top and bottom surfaces of said wax dispensing chamber to accomplish a seal, yet able to rotate in angular alignment with each other about the centerline of said cylindrical wax dispensing chamber, said sealing discs having openings in angular alignment with each other, said openings being radially positioned to be in substantial alignment with said openings in said wax dispensing chamber.

5. The candle making apparatus of claim 4 further including a shaft rigidly attached to said valve body, extending upward through said melting chamber, and a knob attached to said shaft allowing said shaft and said valve body to be rotated within said wax dispensing chamber, whereby said sealing discs serve to open or close said angularly displaced openings in said dispensing chamber in such a manner that the top and bottom openings are never fully or partially open at the same time thereby allowing said wax dispensing chamber to be filled in one angular position of said valve body and to be emptied in another angular position of said valve body.

6. The candle making apparatus of claim 1 further including a screen insertable into said melting chamber for the purpose of collecting contaminants such as used wicking or solid decorating materials.

7. The candle making apparatus of claim 6 wherein said screen is formed into a shape of a cup, edges of said cup having upwardly extending handle means for easy removal of said screen from said melting chamber so contaminants may be discarded therefrom.

8. A candle making apparatus comprising:

a) a hollow heating container with an open top and having an opening at the bottom so said container may be filled with candle wax, heated, and the melted wax subsequently discharged therefrom, b) a measuring container positioned below said heating container and attached thereto so said measuring container may receive molten wax from said heating container, said measuring container having a pre-established volume and an opening at each of its top and bottom surfaces, said openings being openable independently but never at the same time, allowing single or multiple volumes of molten wax to be dispensed therefrom by an action of the user c) at least a singular heating element surrounding and in contact with said heating container for the purpose of melting wax placed into said heating container, d) a candle mold placed beneath said measuring container to receive molten wax therefrom for cooling and solidifying to form a candle and e) a candle wick and a means of supporting said candle wick of a suitable length within said candle mold whereby candles of a variety of sizes and shapes may be formed either by recycling partially used candles or using new candle wax.

9. The candle making apparatus of claim 8 further including a housing comprising abase a lower part and an upper part to provide means for support for said heating container, said measuring container, said heating element and said candle mold to maintain their relative positions.

10. The candle making apparatus of claim 9 wherein said measuring container is cylindrical in shape and includes a hollow rotatable valving insert making intimate contact with said top and bottom surfaces of said measuring container and having openings positioned such that said openings align radially with openings in said measuring container but are angularly displaced so either said top opening or said bottom opening may be opened but never at the same time, allowing said measuring container to be filled with candle wax at one angular position of said valving insert and to be emptied at another angular position of said valving insert.

11. The candle making apparatus of claim 10 further including a vent opening to allow air to escape or enter during filling or emptying operations of said measuring chamber.

12. The candle making apparatus of claim 8 further including a cylindrical screen having an open top and a closed bottom insertable into said heating container for the purpose of catching and discarding any contaminants present in old candle wax.

13. The candle making apparatus of claim 8 further including a plurality of candle molds designed to accommodate an integer number of discharges of melted wax from said measuring container, said candle molds being no smaller in volume than a single discharge from said measuring container, but may be any size larger than the single discharge within the reasonable limits of said candle making apparatus.

14. The candle making apparatus of claim 13 wherein said candle molds are coated with a non-stick coating such as PTFE in order to facilitate removal of solidified wax.

15. The candle making apparatus of claim 13 wherein said candle molds include an internal post of relatively small diameter extending from the base of the mold to the approximate height of the mold thereby leaving a channel in the solidified candle for the purpose of installing a wick.

16. The candle making apparatus of claim 13 wherein said candle molds may be made in a plurality of shapes for the purpose of creating candles of various cross-sectional shapes.

17. The candle making apparatus of claim 13 further including a handle means and flexible members to grasp and hold said candle molds to aid in removing said candle molds from said candle making apparatus.

18. A method of making candles comprising the steps of:

a) providing a hollow melting chamber wherein pieces of candle wax may be placed, b) heating said melting chamber so that wax placed within it may be melted, c) providing an opening in the bottom surface of said melting chamber from which molten wax may exit, d) attaching a cylindrical dispensing chamber to the bottom surface of said melting chamber, said dispensing chamber having a hole in its top surface in substantial alignment with the hole in the bottom surface of said melting chamber so that molten wax discharged from said melting chamber may enter said dispensing chamber, e) providing an opening in the bottom surface of said dispensing chamber from which molten wax may exit, f) providing a rotatable valving insert within said dispensing chamber such that the top and the bottom holes in said dispensing chamber may be opened or closed selectively but never being able to be opened at the same time, allowing said dispensing chamber to be filled with candle wax in one angular position of said valving insert and be emptied in another angular position of said valving insert to allow fixed volumes of candle wax to be dispensed from said dispensing chamber, g) providing a candle mold into which molten wax from said dispensing chamber may flow, wherein said candle mold may be made in various shapes and sizes, h) providing a candle wick and means to support said candle wick within said candle mold so that molten wax dispensed into said candle mold may solidify around it, whereby candles of various shapes and sizes may be made using old left-over candle wax from used candles or new candle wax.

* * * * *